OUTPUT OF
SIGNAL SOURCE

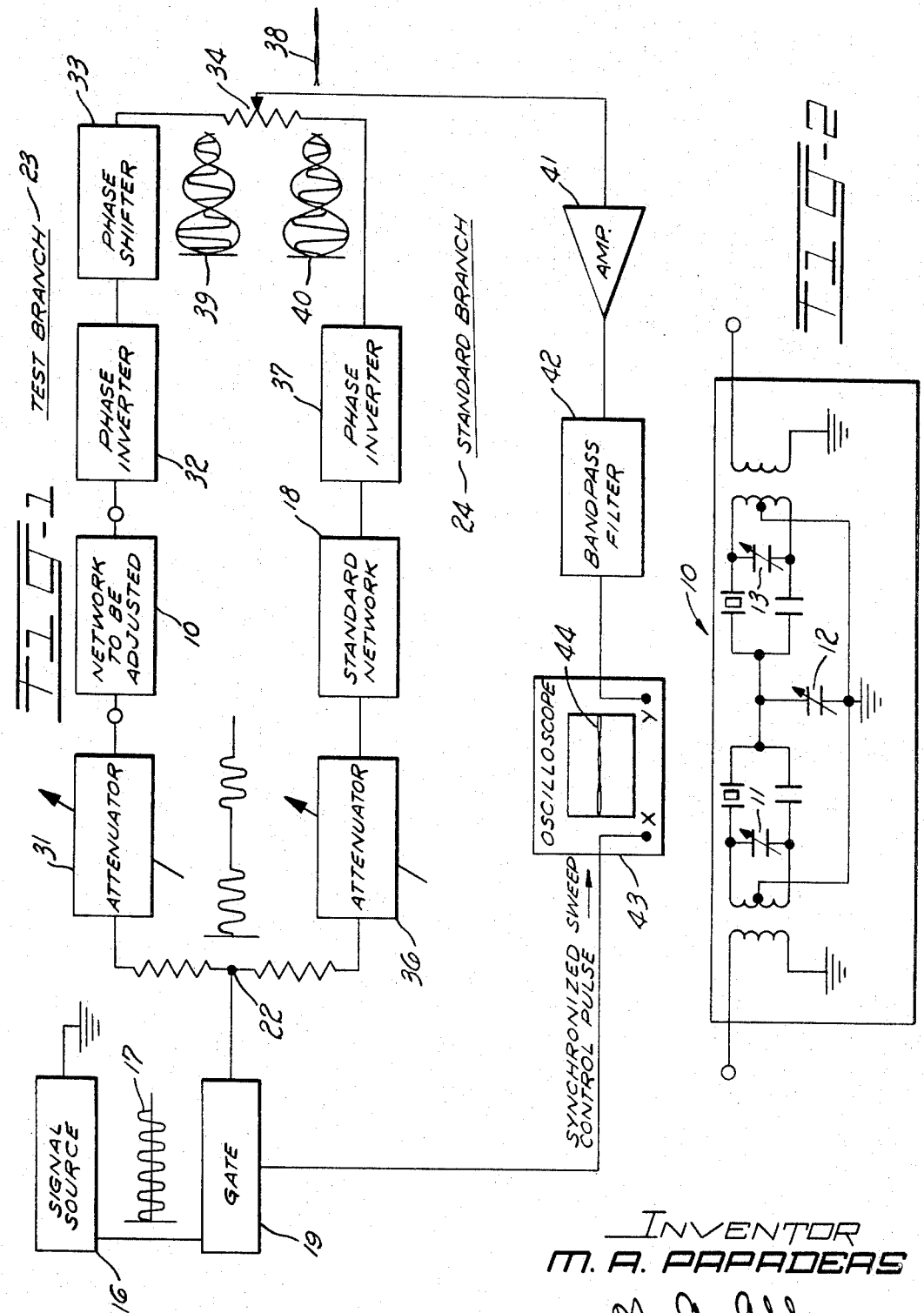

OUTPUT OF GATE

OUTPUT OF
TEST BRANCH

OUTPUT OF
STANDARD BRANCH

DISPLAY ON CRO

United States Patent Office 3,419,799
Patented Dec. 31, 1968

3,419,799
SYSTEM FOR TESTING AND ADJUSTING ELECTRICAL FILTERS HAVING A SIGNAL BURST TRANSMITTING MEANS
Michael A. Papadeas, Andover, Mass., assignor to Western Electric Company, Incorporated, New York, N.Y., a corporation of New York
Filed Sept. 21, 1965, Ser. No. 489,021
11 Claims. (Cl. 324—57)

ABSTRACT OF THE DISCLOSURE

Means and a method for tuning a filter. The filter under test and a standard filter are connected in respective ones of parallel connected matched branched circuits. Both circuits are energized by predetermined bursts of sine wave cycles at the center frequency of the standard filter. Each branch includes a transformer respectively arranged whereby the transient output signals of the branches exhibit a reverse phase relationship with respect to each other. The output signals are supplied to a summing network. If the summed output is a straight line depicted on an oscilloscope, this is indicative that the filter under test matches the standard filter. A deviation from a straight line indicates the requirement of tuning the filter under test until a straight line is achieved.

---

Figure 3A:
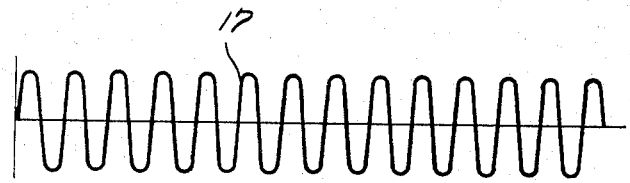

This invention relates to the adjustmnet of frequency responsive networks, and more particularly, to a method of and system for adjusting narrow bandpass filter networks.

In one presently used system for adjusting narrow bandpass filters, a swept frequency signal is applied to a standard filter and to a filter to be adjusted. Signals representative of the frequency response characteristics of both the standard filter and the filter to be adjusted are applied to a cathode ray oscilloscope to simultaneously produce two traces on the oscilloscope screen. The traces representative of the frequency response characteristics of the standard filter and the filter to be adjusted are bell-shaped. An operator manipulates the adjustable elements of the filter to be adjusted to bring its trace into coincidence with the trace of the standard filter displayed on the oscilloscope. An operator may expend a considerable amount of time in attempting to bring the traces of two such frequency response characteristics into coincidence.

Accordingly, an object of this invention is to provide a new and improved method of and system for adjusting frequency responsive networks.

Another object is to provide a new and improved method of and system for adjusting narrow bandpass filter networks.

Another object is to provide a new and improved, inexpensive, and simply operable method of and system for adjusting narrow bandpass filter networks.

With these and other objects in view, the invention contemplates a method of adjusting frequency responsive filter networks wherein a burst of signals is simultaneously applied to a standard network and a network to be adjusted. The burst of signals has a frequency corresponding to the center frequency of the frequency response characteristics of the standard filter. The transient response signal of either the standard filter or the filter to be adjusted is inverted so that the transient response signals are 180° out of phase with respect to each other. The transient response signals are electrically added, and thereafter the adjustable elements of the filter to be adjusted are tuned until the electrical sum of the respective transient response signals has substantially zero magnitude.

An apparatus for practicing the method of the invention and illustrating the principles thereof, includes a signal source for generating a continuous train of signals having a frequency corresponding to the center frequency of the bandwidth of a standard filter of the type to be adjusted. An electronic gate alternately passes and blocks a predetermined number of cycles of the train of signals which are coupled to a standard filter and to a filter to be adjusted. Circuitry is provided for establishing an inverse phase relationship between the transient response signals of the standard filter and the filter to be adjusted. The transient response signals are coupled to a summing network, the output of which is applied to a visual display device. If the output signal of the summing network appears substantially as a straight line on the visual display device, the filter to be adjusted substantially matches the standard filter. If not, the adjustable elements of the filter to be adjusted are tuned until a substantially straight line appears on the visual display device.

Figure 3B:
Figure 3C:
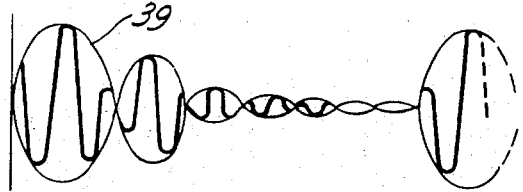
Figure 3D:
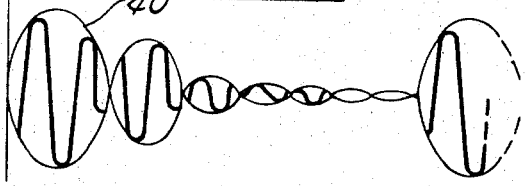
Figure 3E:
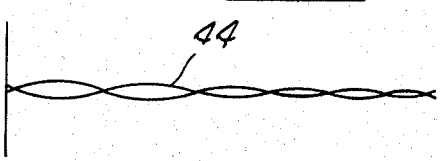

Other objects and advantages of the invention will become apparent by reference to the following detailed specification and accompanying drawings, wherein:

FIG. 1 is an electrical block diagram of a system for adjusting frequency sensitive filter networks in accordance with the principles of the invention;

FIG. 2 is an electrical schematic diagram of a crystal filter of a type which may be adjusted using the system shown in FIG. 1; and FIGS. 3A to 3E are waveform diagrams showing the electrical conditions existing at various points of the system depicted in FIG. 1. In particular, FIG. 3A illustrates the output of the signal source; FIG. 3B indicates the output of the gate; FIGS. 3C and 3D illustrate the outputs respectively of test and standard branches; and FIG. 3E illustrates the CRO display.

Referring to FIG. 2, there is shown a frequency responsive filter network 10 to be adjusted, which by way of example, may be a conventional narrow bandpass, crystal filter having adjustable capacitors 11–13 which may be tuned to adjust the bandwidth of the frequencies transmitted by the filter. The frequency response characteristics curve of a bandpass filter is usually bell-shaped over the range of frequencies that it transmits between the points of interest on the curve, such as the 3 db points. The frequency response curve has a geometric center frequency at the crest thereof at which the maximum strength signal is transmitted.

In FIG. 1, a signal source 16 generates a signal 17 comprising a continuous train of phase coherent sine wave cycles (FIG. 3A) having a frequency corresponding to the center frequency of a standard filter 18 of the type to be adjusted. Standard filter 18 is preadjusted to exhibit a predetermined frequency response and transient response. An electronic gate 19 is connected to the output of signal source 16 and alternately passes and blocks a predetermined number or burst 21 of cycles of signal 17 (FIG. 3B). Gate 19 may be a rectangular or a square-wave generator which modulates signal 17. The number of cycles of signal 17 comprising burst 21 is determined by dividing the center frequency by the bandwith between the points of interest, for example, the 3 db points of the frequency response curve for standard filter 18. Gate 19 passes burst 21 to junction 22, from which burst 21 is applied to a test branch 23 connected in parallel with a standard branch 24.

Test branch 23 comprises a variable attenuator 31 having its input connected through a resistor to junction 22, and its output connected to a filter 10 to be adjusted. The output of filter 10 is connected to a phase inverter 32 which in turn is connected to a phase shifter 33. The output of phase shifter 33 is connected to a resistive summing network 34.

Standard branch 24 comprises a variable attenuator 36 having its input connected through a resistor to junction 22, and its output connected to standard filter 18. The output of standard filter 18 is connected to a phase inverter 37 having its output connected to summing network 34.

When burst 21 is coupled to test branch 23 and standard branch 24, filter 10 to be adjusted and standard filter 18 produce transient response signals which are applied to phase inverters 32 and 37. Phase inverters 32 and 37 may be matched transformers with their windings arranged to render the transient response signals of filter 10 to be adjusted and standard filter 18 180° out of phase with respect to each other; that is, transient signals 39 and 40 exhibit an inverse phase relation with respect to each other (FIG. 3C, FIG. 3D). Matched transformers may be used as phase inverters 32, 37 to sustain a balanced insertion in branches 23, 24.

Attenuators 31 and 36 are adjusted so that the amplitude of burst 21 applied to filter 10 to be adjusted is equal in amplitude to burst 21 applied to standard filter 18. Attenuators 31 and 36 are also adjusted to compensate for any difference in attenuation introduced into test branch 23 and standard branch 24 by filter 10 to be adjusted and standard filter 18, respectively.

The transient response signals of filter 10 to be adjusted and standard network 18, which now exhibit a 180° phase relationship with respect to each other, are electrically added at summing network 34. The result of this electrical algebraic addition is a composite signal 38 which is amplified by an amplifier 41 and applied to a bandpass filter 42. Bandpass filter 42 does not introduce any loss or phase distortion into composite signal 38. Bandpass filter 42 limits the bandwith of a trace 44 displayed on a cathode ray oscilloscope 43, and filters out any noise signals or the like which are generated by amplifier 41.

Signal source 16 also generates sweep control pulses which are passed by gate 19 to be applied to oscilloscope 43 for synchronizing the sweep thereof with the application of burst 21 to junction 22. Bursts 21 are sufficiently spaced apart to prevent overlap of successive transient response signals 39 and 40, respectively, of filter 10 to be adjusted and standard filter 18.

If trace 44 displayed on oscilloscope 43 is substantially a straight line (FIG. 3E) then filter 10 to be adjusted substantially matches standard filter 18 and is an acceptable product. If trace 44 is not substantially a straight line, an operator simply adjusts capacitors 11–13 until trace 44 displayed on oscilloscope 43 is substantially a straight line.

Prior to adjusting filter 10 to be adjusted, the system depicted in FIG. 1 is calibrated. Conductors are placed across the terminals for receiving filter 10 to be adjusted and standard filter 18 in test branch 23 and standard branch 24, respectively. Bursts 21 of signal 17 are applied to test branch 23 and standard branch 24. If the trace displayed on oscilloscope 43 is a straight line, this indicates that test branch 23 and standard branch 24 are structurally and electrically identical. If the display on oscilloscope 43 is not a straight line, phase shifter 33 is adjusted until the trace on oscilloscope 43 is a straight line, indicating that the system is calibrated. Alternatively, the system can be calibrated by inserting a prefectly matched standard filter 18 into test branch 23 and standard branch 24. Once calibrated, phase shifter 33 is not utilized until it is desired to check the calibration of the system again.

It is to be understood that the various units used in the practice of the method of the invention are conventional. Therefore, detailed descriptions of such units are deemed unnecessary. It is to be further understood that the above-described method and system of the invention are merely illustrative of its principles, and other embodiments may be devised without departing from the scope of the invention.

What is claimed is:

1. A method of adjusting frequency responsive networks having adjustable elements, comprising the steps of:

transmitting a burst of signals to a network to be adjusted and a standard network of the type to be adjusted, the burst of signals having a frequency corresponding to the center frequency of the frequency response characteristics of the standard network, the number of cycles in a burst is determined by dividing said center frequency by the band width between points of interest of said frequency responsive characteristics of the standard network, adjusting the phase relation of the transient output signals from the standard network and the network to be adjusted until the respective transient output signals exhibit an inverse phase relation with respect to each other, electrically adding the phase adjusted transient output signals, and tuning the adjustable elements of the network to be adjusted until the electrical sum of the phase adjusted transient output signals from the standard network and network to be adjusted is substantially relative zero.

2. A method of adjusting frequency response networks having adjustable elements, comprising the steps of:

transmitting a burst of signals to a network to be adjusted and a standard network of the type to be adjusted, the burst of signals having a frequency corresponding to the center frequency of the frequency response characteristics of the standard network, the number of cycles in a burst is determined by dividing said center frequency by the band width between points of interest of said frequency responsive characteristics of the standard network, inverting the transient output signals from one of the networks such that the respective transient output signals exhibit an inverse phase relation with respect to each other, electrically adding the transient output signals, and tuning the adjustable elements of the network to be adjusted until the electrical sum of the phase and voltage adjusted transient output signals from the standard network and network to be adjusted is substantially relative zero.

3. The method of adjusting frequency responsive networks according to claim 1, further comprising the step of indicating the electrical sum.

4. The method of adjusting frequency responsive networks according to claim 2, wherein the electrical sum is indicated on a visual display means.

5. The method of adjusting frequency responsive networks according to claim 4, wherein the adjustable elements of the network to be adjusted are tuned until the electrical sum displayed on the visual display means is substantially a straight line, thereby indicating that the network to be adjusted substantially matches the standard network.

6. A method of adjusting bandpass filters, having tunable elements, to match a standard bandpass filter having a known frequency and transient response, comprising the steps of:

applying a burst of signals, corresponding to the center frequency of the bandwidth for the standard filter, to the standard filter and to a filter to be adjusted, the number of cycles in a burst is determined by dividing said center frequency by the bandwidth between points of interest of the frequency responsive curve of the standard filter, phase adjusting the transient response signals of the standard filter and the filter to be adjusted produced in response to the burst of signals until the response signals are 180° out of phase with respect to each other, electrically adding the phase adjusted transient response signals, and tuning the adjustable elements of the filter to be tested until the sum of the electrically added transient response signals has substantially relative zero magnitude, thereby indicating that the filter to be adjusted matches the standard filter.

7. The method of adjusting bandpass filters according to claim 6, further comprising the step of displaying the sum of the electrically added transient response signals on a visual display means.

8. The method of adjusting bandpass filters according to claim 7, wherein the adjustable elements of the filter to be adjusted are tuned until the sum of the electrically added transient response signals displayed on the visual display means is substantially a straight line, thereby indicating that the filter being adjusted substantially matches the standard filter.

9. The method of adjusting bandpass filters according to claim 8, wherein the visual display means is an oscilloscope.

10. A system for adjusting frequency responsive filter networks having adjustable elements, comprising:

first and second transmission circuits, the first circuit having connections for receiving a network to be adjusted, the second circuit having connections for receiving a standard network of the type to be adjusted having prescribed frequency and transient response characteristics over its bandwidth, means for generating a burst of signals having a frequency corresponding to the center frequency of the prescribed frequency response characteristics of the standard network, the number of cycles in a burst is determined by dividing said center frequency by the band width between points of interest of said frequency responsive characteristics of the standard network, means for coupling the burst of signals to the transmission circuits, means for inverting the transient response signal produced by one of the filters in response to the burst of signals such that an inverse phase relation exists therebetween, means coupled to the output of the first and second transmission circuits for electrically adding the phase inverted transient response signals to produce a composite signal, and means for visually displaying the composite signal, the adjustable elements of the network to be adjusted being tuned until the composite signal is substantially a straight line on the visual display means, thereby indicating that the network to be adjusted matches the standard network.

11. The system according to claim 10, wherein the visual display means is an oscilloscope.

References Cited

UNITED STATES PATENTS

| | | | |
|---|---|---|---|
| 1,684,403 | 9/1928 | Mason | 324—57 |
| 2,685,063 | 7/1954 | Alsberg | 324—57 XR |
| 2,722,659 | 11/1955 | Dickey et al. | 324—57 |
| 2,749,516 | 6/1956 | Ragazzini | 324—88 |
| 2,769,957 | 11/1957 | Zito et al. | 324—57 |

RUDOLPH V. ROLINEC, *Primary Examiner.*

E. E. KUBASIEWICZ, *Assistant Examiner.*

U.S. Cl. X.R.

324—83